May 27, 1930. J. H. REICHART 1,759,957
ELECTRIC AND FIRELESS COOKER
Filed Feb. 15, 1926
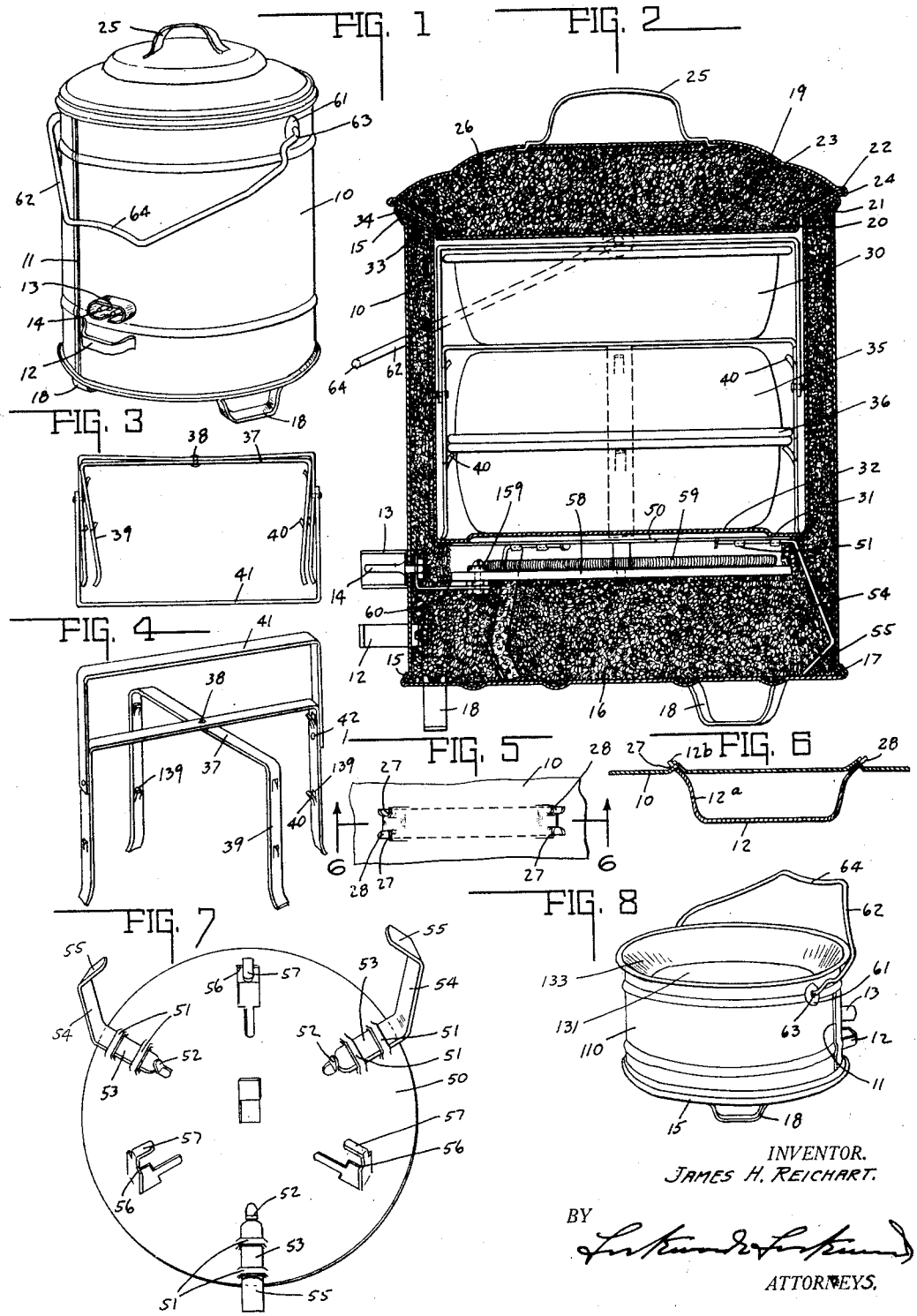
INVENTOR.
JAMES H. REICHART.
BY
ATTORNEYS.

Patented May 27, 1930

1,759,957

UNITED STATES PATENT OFFICE

JAMES H. REICHART, OF MUNCIE, INDIANA

ELECTRIC AND FIRELESS COOKER

Application filed February 15, 1926. Serial No. 88,423.

This invention relates to a combination electric and fireless cooker.

The chief object of the invention is to construct the combination cooker with certain structural arrangements whereby simplicity and rigidity is secured.

Another chief feature of the invention consists in the formation of a simplified bracket or combination stand for supporting more than two vessels in a plurality of formations.

Another feature of the invention consists in the standardization of many of the parts and the utilization thereof for handle and foot purposes.

Another feature of the invention consists in the positioning of the handle and the terminal adjacent each other for protection of the latter and adjacent the strongest portion of the container, to wit, the side connection.

Another feature of the invention consists in the detachable support of spring feet or spacers associated with the heating element.

The full nature of the invention will be understood from the accompanying drawings and the following description and claims:

In the drawings Fig. 1 is a perspective view of one form of the invention. Fig. 2 is a central sectional view thereof showing a plurality of vessels positioned therein. Fig. 3 is a perspective view of the vessel stand in collapsed relation. Fig. 4 is a similar view of the stand in operative position. Fig. 5 is an elevational view looking at the interior of an interchangeable handle or foot. Fig. 6 is a sectional view taken on line 6—6 of Fig. 5 and in the direction of the arrows. Fig. 7 is a perspective view of the heating element supporting plate. Fig. 8 is a perspective view of a modified form of the invention, the same being of the griddle or frying pan type.

In the drawings 10 indicates an exterior metallic shell forming plate suitably formed or corrugated for strengthening purposes and having a transverse or connecting side seam 11. Immediately adjacent the seam is a handle 12 for tilting the container for pouring purposes. Immediately adjacent the handle is a terminal guard construction 13 having the usual terminals 14 therein. Thus the same is adapted to be connected to an electrical extension cord for supplying energy to the invention. It will be observed from Figs. 1 and 2 that the handle is positioned at probably what is the strongest part of the container, to wit, that portion forming the joint or connection 11, and that the handle 12 serves as a protector for the terminal guard 13 which is positioned immediately adjacent thereto and immediately adjacent the seam for the same purpose of securing a relatively stable mounting.

The upper and lower ends of the shell 10 are flared outwardly as at 15. The base 16 has an inturned edge 17 for a snap connection with the flared edge 15 whereby said base is secured to the shell. The base supports a plurality of feet 18 and herein three of said feet are shown.

The cover is shown clearly in Fig. 2 and comprises a circular portion 19 including a cylindrical extension 20, from which extends angularly and outwardly an inclined portion 21 having the lateral flange 22. The upper part of the cover 23 includes a complementary inturned and over-lapping portion 24 for securing the two portions of the cover together. A handle 25 is suitably secured to the cover and it is by the same that the cover is removed. Within the cover the space is filled with mineral wool 26 which serves as a heat insulator.

Reference will now be had particularly to Figs. 5 and 6 and in these figures the method of mounting the handle 12, the feet 18 and the handle 25 is illustrated. The body 10 is suitably apertured by two pairs of spaced openings 27 and 28. The handle portion 12 includes the spacing arms $12^a$ with the projecting slotted ends $12^b$ which extend through the spaced openings 27 and 28 and frictionally engage the edge thereof. Said openings 27 and 28 are so formed that the material forming the same is turned inwardly and serves as a bearing surface or fulcrum when pressure is applied to the handle or feet. Thus a detachable but self locking mounting is provided for the handle and feet so that the device may be shipped in knock down and may be readily assembled at the factory if it is not desired to ship knock down.

The interior of the cooker includes a cylindrical shell 30 and a bottom 31, said bottom including an annular embossment or offset 32. This embossment insures that no matter what the expansion is by reason of the variation of heat, the resultant movement of the bottom 32 will always be coaxial with the wall 30 and thus the vessels placed upon the bottom 32 will always level if the container is level and there will be no sloppage or spillage by reason of cocking of the vessel due to unequal expansion.

The upper end of the tubular container 30 is flared upwardly and outwardly as at 33 and forms a flared cylindrical mouth for pouring purposes which being a part of the extending edge or lip prevents it from dripping and will, therefore, pour clear and free. The vessel, therefore, is well adapted to pour as well as cook soups, gravies and the like. The outer edge of this flared portion is turned downwardly and inwardly as at 34 and serves to form a seat or groove to receive the outwardly and upwardly projecting end 21 of the shell 10 and lock the same therein. All available space between said shells 10 and 30 not otherwise occupied as hereinafter specified, is filled with mineral wool which serves as an electrical and thermal insulator.

In the cooking compartment thus formed, there may be positioned a plurality of vessels such as indicated at 35, each of which is provided with a beaded edge 36. These vessels as shown clearly in Fig. 2, are adapted to be supported in superposed relation within the cooking chamber, or may be supported in roaster forming association.

The vessel supporting framework as shown clearly in Figs. 2, 3 and 4, consists of a pair of U-shaped strap members having their base portions 37 connected together at 38 and having their free ends or arms 39 extending in the same direction, thus forming a stand. The ends or arms are suitably notched as at 139 and the tongues 40 formed by said notch project inwardly and are adapted to under-lie the beaded edge of the vessel 35 and thus support said vessel in suspended relationship. In Fig. 2 but the lower vessel is shown supported in suspended relationship, the intermediate vessel being shown in an inverted position and resting upon the lowermost vessel. If it is desired, however, the intermediate vessel 35 may be inverted and positioned so that its bead 36 is positioned above the uppermost supporting tongues 40. In order to position a vessel in the framework thus described, the framework is placed astraddle or over the vessel and the vessel elevated until the bead passes over the resilient tongues and is retained thereby.

In order to readily remove the vessels from the cooking compartment the frame previously described is provided with a U-shaped handle 41 which is pivotally connected to the framework as at 42. Fig. 3 shows said handle and said framework in the collapsed or knockdown position. Fig. 4 shows the same in the usual position. Fig. 2 shows the positioning of the framework. The topmost vessel 35 is straddled by the handle portion 41, which is elevated for handle purposes and for retaining said vessel in position.

Reference will now be had to Figs. 2 and 7 wherein the heating portion of the device is shown in detail. A supporting plate 50 is herein shown of sheet metal and is provided with a plurality of radially positioned perforations in the form of a pair of radially arranged spaced offsets 51 adjacent which is an inturned lateral portion or tongue 52. Said offsets 51 are adapted to slidably receive one end 52 of a spring supporting foot. The sliding and frictional movement of the tongue 53 is limited by the abutment forming tongue 52. The spring portion 53 includes an intermediate and spacing portion 54 with an inturned end 55. When the plate 50 is positioned adjacent the bottom 31 and the spring portions 55 and 54 engage the bottom or base portion 16 and the shell 10 and the junction of the intermediate and end portions 54 and 55 respectively bear against the shell 10, and thus the plate 50 is centered and maintained in yielding engagement with the bottom 31, and furthermore is centered with respect thereto, since a plurality of said spacing and yielding supports are provided and are arranged in spaced relation for such purpose.

The plate 50 is also provided with a punched portion 56 which has an angular portion 57 adapted to lie substantially parallel to the plate portion 50. Said portions 57 are so arranged that they extend beneath an insulation plate 58 and support the same, said insulation plate being maintained in relatively rigid relation with respect to sidewise movement with reference to plate 50 by the connecting portions 56, and is spaced relation by the shouldering thereof.

The insulation plate 58 supports a heating element 59 in the chamber or space formed between plate 50 and said insulation plate 58. Said electrical heating element, which may be of any desired form so long as it is satisfactory for operation, includes a terminal 159 supported by the insulation plate and said terminal is in electrical connection with a relatively yielding strap connection 60, in turn connected to the terminal 14.

The body 10 includes a pair of embossments 61 having central openings diametrically positioned with respect to each other. A V-shaped handle or bail 62 has inturned ends 63 receivable by the openings in the embossments 61. The arrangement of the bail is such that the intermediate or central portion 64 is always maintained in spaced relation from the shell 10, the inclined connecting portions 62 engaging the shell 10 intermediate their ends.

In Fig. 8 a modified form of the invention is illustrated and in this form of the invention there is shown a griddle. The general construction of this device is substantially the same as that hereinbefore described, except that the width or height of the shells are materially reduced. In fact the inner shell has substantially no cylindrical portion whatsoever, and furthermore the base 131 is connected directly to the outwardly and upwardly inclined flared portion 133. This forms a skillet in which gravies can be made and the like and readily poured without spillage or drippage since the same type of mouth as previously described is formed by the flared mouth, the outer edge thereof being turned downwardly and inwardly to overlie the outer wall. In this form of the invention the bail 62 has its ends 63 receivable by the perforated embossments 61, said bail being formed to position the handle 64 away from the outer wall 110. Wall 110 has the seam 11 and is retained in position by the inturned continuation of flared portion 133 and by flange 15 of the bottom. Said wall supports the terminal guard 13 beneath which is mounted the handle 12 for pouring purposes and for protecting the terminal guard. The bottom supports the legs 18.

Thus the several parts are arranged for use in both the fireless cooker or the griddle cooker. The interior construction of the griddle is a duplicate of that shown in Fig. 2 or may be otherwise formed.

In Fig. 2 it will be noted that the diameter of the heating chamber is greater than the diameter of the heating element 59. With this construction the heat passes upwardly through the bottom 32 and tends to centralize and pass upwardly in a central column if water, soup or the like is being heated in the cooker. This upwardly directed central column of heat produces an outer enveloping downwardly directed cooler column which tends to pass laterally along the bottom 32 and upwardly into the central column after it is heated. By the foregoing arrangement it is possible to obtain in the center of the cooker temperatures from 50 to 150 degrees higher than that immediately adjacent the annular wall of the cooking chamber. The foregoing arrangement, therefore, permits the reduction of the amount of insulation material required between the two walls forming the sides of the cooker and still retain an efficiency equivalent to thicker walls, in other words the air or liquid being heated in the cooker forms a partial insulator adjacent the inner wall of the cooking chamber. The stand or support shown in Figs. 3 and 4 is shown positioned in Fig. 2 and as illustrated therein, the same supports the vessels in centralized position in the cooker and in the path of the greatest heat, to wit, that of the central column.

The invention claimed is:

1. In a device of the character described, the combination of a substantially U-shaped strap member, each end being U-shaped, and a supporting portion having a plurality of spaced pairs of openings for receiving said U-shaped ends of the U-shaped strap.

2. A device of the character defined by claim 1 characterized by the addition of tongues projecting from the support adjacent the opening and formed therefrom and adapted to lie adjacent to and be engaged by the projecting ends of the U-shaped ends of said U-shaped strap.

3. In a device of the character described, the combination of a supporting plate, a pair of parallel but adjacent slotted portions, and a single foot portion simultaneously and slidably seated by said slotted offset portions and interposed therebetween and the body portion.

4. A device of the character defined by claim 3 characterized by the addition of a slotted tongue formed from said plate and abuttable by said foot for limiting the sliding movement thereof with respect to the slotted offset portions.

5. A device of the character described, the combination of a metallic heating plate, an insulation plate, a heating element supported thereby, another metallic supporting plate having a central portion in spaced relation to both with the heating element positioned between said first mentioned pair of plates, and a plurality of anchorages each comprising a tongue integral with one metallic plate and struck therefrom for engaging and securing the insulation plate in spaced relation to the supporting metallic plate.

6. In a device of the character described, the combination of a metallic heating plate, an insulation plate, a heating element supported thereby, another metallic supporting plate having a central portion in spaced relation to both with the element positioned between said first mentioned pair of plates, and a plurality of anchorages each comprising a shouldered portion and an elongated extension, one face of said insulation plate being engaged by the shouldered portions of said anchorages and its opposite face being engaged by the elongated extensions thereof for engaging and securing the insulation plate in spaced relation to the supporting metallic plate, the other metallic plate being imperforate and forming a cooking bottom.

7. A device as defined by claim 6, characterized by the shouldered portion and the elongated extension of each anchorage comprising a tongue integral with said supporting metallic plate and struck therefrom.

8. In a device of the character described, the combination of an imperforate metallic heating plate, an insulation plate, a heating element supported thereby, a second metallic plate in spaced relation to said insulation plate and having a portion abutting said first-mentioned heating plate, said heating element being positioned between the second mentioned plate and the insulation plate, and a plurality of downwardly directed legs supported by the second mentioned metallic plate.

9. A device as defined by claim 8 characterized by the addition of a casing portion enveloping said insulation plate forming a chamber therewith, and insulating means filling said chamber.

10. In a device of the character described, the combination of an imperforate metallic heating plate, an insulation plate, a heating element supported thereby, a second metallic plate in spaced relation to said insulation plate and having a portion abutting said first-mentioned heating plate, said heating element being positioned between the second mentioned plate and the insulation plate, and a plurality of downwardly directed legs supported by the second mentioned metallic plate, said legs and said second mentioned metallic plate having a detachable connection therebetween.

11. A device as defined by claim 10 characterized by the addition of a casing portion, including a closure enveloping said insulation plate forming a chamber therewith, a closure therefor, and insulating means filling said chamber, the opposite end of said legs bearing upon the chamber forming closure.

In witness whereof I have hereunto affixed my signature.

JAMES H. REICHART.